United States Patent [19]

Takada

[11] Patent Number: 4,772,145

[45] Date of Patent: Sep. 20, 1988

[54] DOCUMENT PREPARING APPARATUS WHICH AUTOMATICALLY CAPITALIZES CHARACTERS AT THE HEAD OF A SENTENCE

[75] Inventor: Hiromi Takada, Yokohama, Japan

[73] Assignee: Ricoh Company, Ltd., Tokyo, Japan

[21] Appl. No.: 814,930

[22] Filed: Dec. 30, 1985

[30] Foreign Application Priority Data

Jan. 12, 1985 [JP] Japan .................... 60-3706

[51] Int. Cl.⁴ ............................. B41J 25/24
[52] U.S. Cl. .................... 400/252; 400/314; 400/315
[58] Field of Search ............... 400/251, 252, 253, 254, 400/314, 315, 318, 62

[56] References Cited

U.S. PATENT DOCUMENTS

| | | | |
|---|---|---|---|
| 1,509,228 | 9/1924 | Carino | 400/314 |
| 2,938,618 | 5/1960 | Niccolls | 400/315 |
| 3,023,876 | 3/1962 | Niccolls | 400/315 |
| 3,162,289 | 12/1964 | Davies | 400/318 |
| 3,823,389 | 7/1974 | Heitman et al. | 400/62 X |

FOREIGN PATENT DOCUMENTS 0136468 3/1983 Japan .................... 400/252

OTHER PUBLICATIONS

IBM Technical Disclosure Bulletin, "Keyboard Device for Upper and Lower Case Keying Without Shifting", Bantz et al, vol. 21, No. 9, Feb. 1979, pp. 3845–3846.
IBM Technical Disclosure Bulletin, "Automatic Capitalization and Spacing of Sentences", vol. 28, No. 9, Feb. 1986, pp. 4160–4161.

Primary Examiner—Ernest T. Wright, Jr.
Attorney, Agent, or Firm—Oblon, Fisher, Spivak, McClelland & Maier

[57] ABSTRACT

A document preparing apparatus capable of preparing a document in which small letters and capital letters are printed together, e.g. a document in English. The apparatus includes a decision circuit for deciding whether or not a character to be processed is at a head of a sentence, and a capitalizing circuit for capitalizing the character when the decision circuit decides that the character heads a sentence.

4 Claims, 13 Drawing Sheets

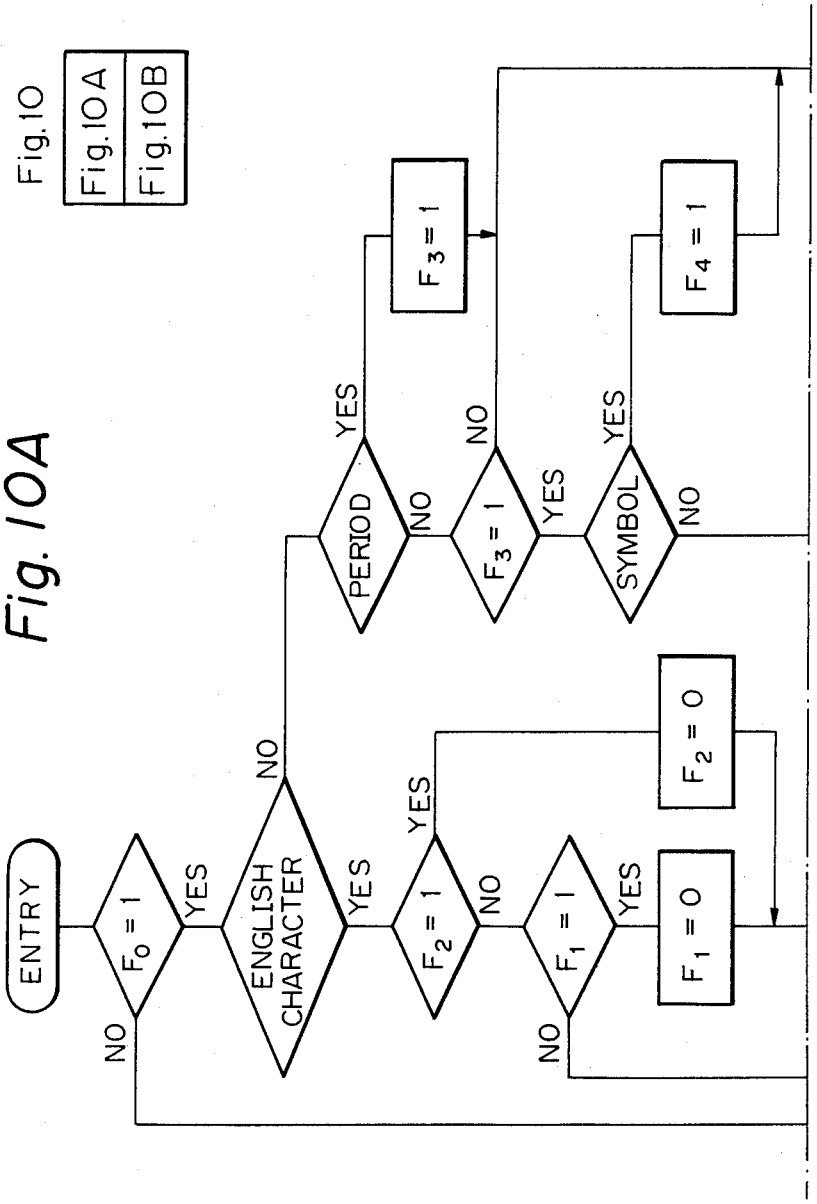

Fig.11A   the head and in frontal ........
Fig.11B   The head and in frontal ........

Fig.12A   the ...... an unexpected.⬜the head ⋮
Fig.12B   The ...... an unexpected. The head ⋮

Fig.13A   the ...... an unexpected.↵
          the head ⋮
Fig.13B   The ...... an unexpected.
          The head ⋮

Fig. 14A  "we're dealing ... dealer network."☐the dealer

Fig. 14B  "We're dealing ... dealer network." The dealer

Fig. 15A  ............selling our product.☐"we're dealing ...

Fig. 15B  ............selling our product. "We're dealing ...

DOCUMENT PREPARING APPARATUS WHICH AUTOMATICALLY CAPITALIZES CHARACTERS AT THE HEAD OF A SENTENCE

BACKGROUND OF THE INVENTION

The present invention relates to a docment preparing apparatus capable of preparing a document in which uppercase characters and lowercase characters are printed together, e.g. a document in English.

Today, various kinds of document processing apparatuses are available as typified by an electronic typewriter, a word processor and a data processor. Some of such apparatuses have a capability for preparing documents in English or like language in which uppercase characters and lowercase characters exist together and, traditionally, this capability is implemented with a so-called shift key for selecting either uppercase characters or lowercase characters and a shift lock key for setting up a shift lock condition. In an English document, for example, a sentence usually begins with an uppercase character. To start such a sentence with any of the prior art apparatuses, a person manipulates the shift key or the shift lock key to select an uppercase mode, then a key associated with a desired character, then the shift key or the shift lock key again to cancel the uppercase mode and select a lowercase mode instead, and then another key associated with a character to follow the uppercase letter.

However, manipulating the shift key or the shift lock key every time a character at the head of a sentence is to be keyed in is troublesome and limits the operationability.

SUMMARY OF THE INVENTION

It is therefore an object of the present invention to provide a document preparing apparatus which enhances operationability.

It is another object of the present invention to provide a generally improved document preparing apparatus.

A document preparing apparatus of the present invention comprises a decision circuit for determining whether or not a character to be processed is at a head of a sentence, and a capitalizing circuit for capitalizing the character to be processed when the decision circuit determines that the character is at a head of a sentence.

The capitalizing circuit comprise an instruction circuit for instructing validity/invalidity of the capitalizing processing. The capitalizing circuit may further comprise a circuit for effecting printout every time one character is entered or every time one line of characters are entered.

The above and other objects, features and advantages of the present invention will become more apparent from the following detailed description taken with the accompanying drawings.

BRIEF DESCRIPTION OF THE DRAWINGS

FIGS. 11A and 11B, 12A and 12B, 13A and 13B, 14A and 14B, and 15A and 15B are views which are useful for more particularly describing any of the procedures shown in FIGS. 9 and 10.

DESCRIPTION OF THE PREFERRED EMBODIMENT

While the document preparing apparatus of the present invention is susceptible of numerous physical embodiments, depending upon the environment and requirements of use, a substantial number of the herein shown and described embodiment have been made, tested and used, and all have performed in an eminently satisfactory manner.

Figure 1:
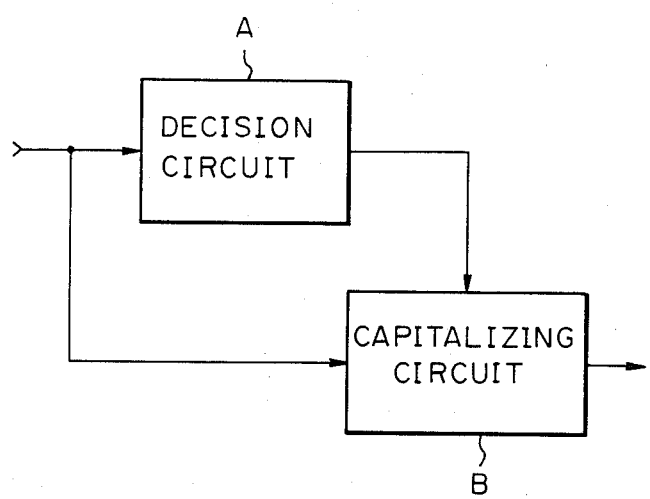
FIG. 1 is a block diagram of a document preparing apparatus embodying the present invention.

Referring to FIG. 1 of the drawings, a document preparing apparatus in accordance with the present invention is shown in a schematic block diagram. Generally, the apparatus is constructed such that a decision circuit A decides whether a character keyed in is at the head of a sequence and, if the result of the decision is positive, a capitalizing circuit B capitalizes the character. That is, a character at the beginning of a sentence is automatically capitalized. This allows one to prepare a document maintaining a lowercase mode, that is, eliminates the need for manipulating a shift key for each character with which a sentence begins, thereby enhancing operationability.

Details of the illustrative embodiment will be described with reference made to FIGS. 2–15B.

Figure 2:
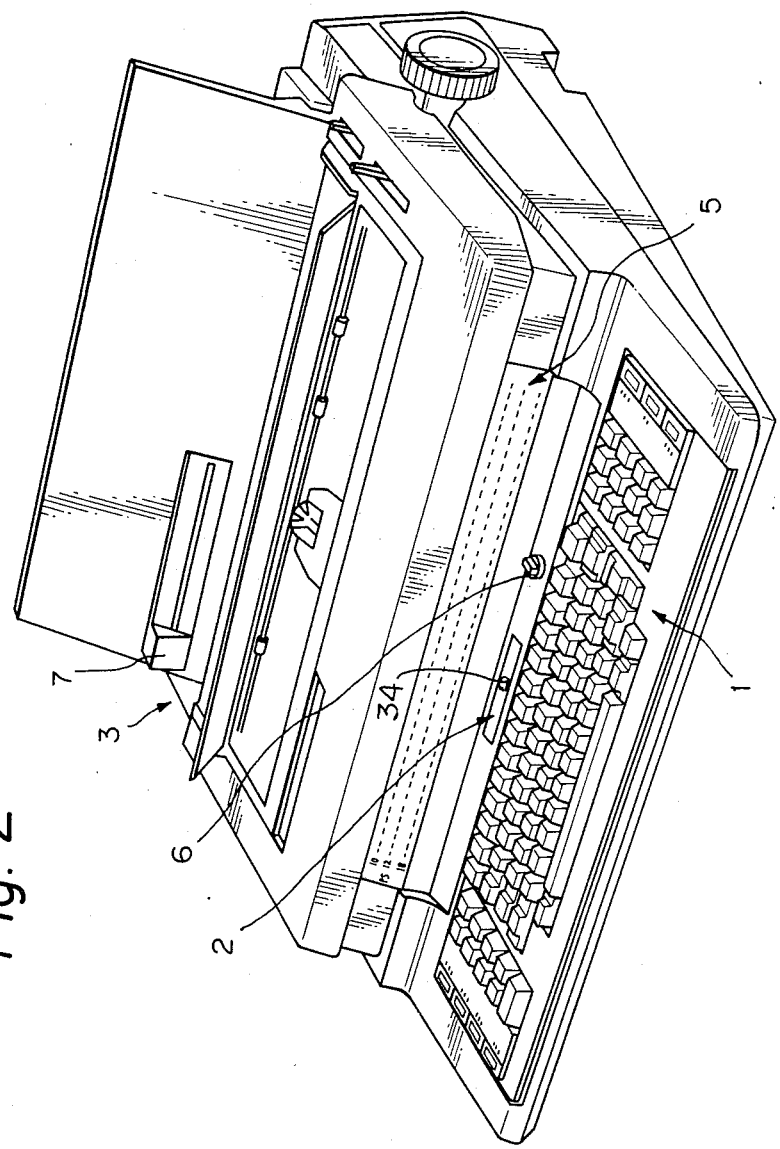
FIG. 2 is a perspective view of an electronic typewriter to which the present invention is applied.

Referring to FIG. 2, an electronic typewriter to which the principle of the present invention is applied is shown. The electronic typewriter generally comprises a keyboard 1 adapted to enter various character data and control data, a liquid crystal display (LCD) 2 capable of displaying a part of one line of text, e.g., sixteen to twenty-six characters which are entered through the keyboard 1, and a printer 3 which uses a typewheel 58 shown schematically in FIG. 5. The typewriter is furnished with character scales 5 and a control 6 which is manipulatable to adjust the luminance of the display 2. The printer 3 is provided with a paper guide 7.

Figure 3:
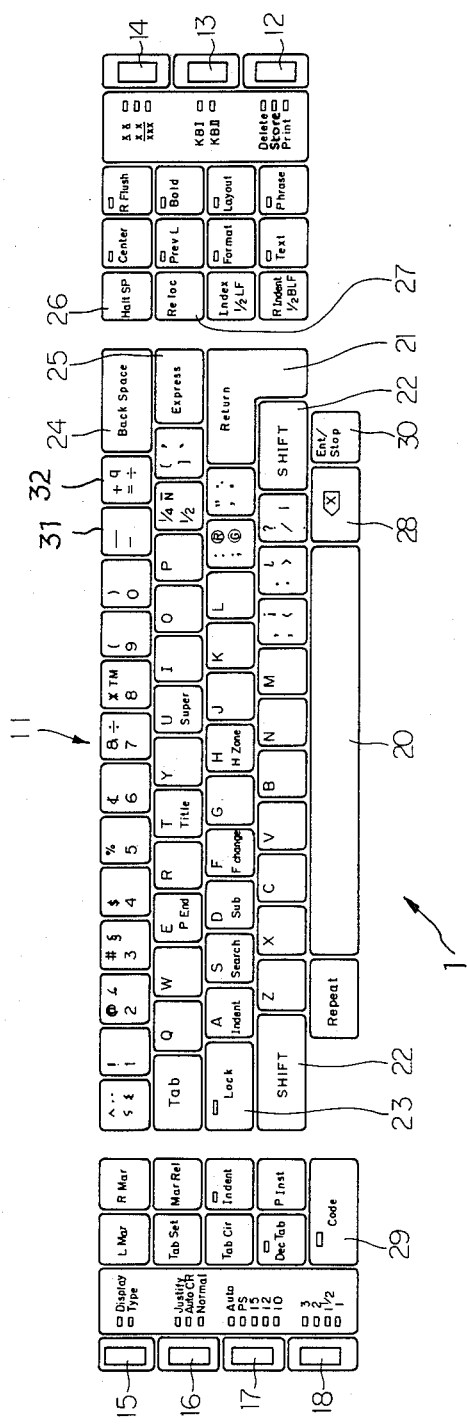
FIG. 3 is a plan view showing an exemplary key arrangement on a keyboard which is associated with the electronic typewriter of FIG. 2.

As shown in FIG. 3, the keyboard 1 has various keys arranged thereon. The keys include a group of alphanumeric keys, or A/N keys, 11 for entering character and graphic data which are imprinted on the key tops. The keys also include selection keys which comprise an operation select key 12, a keyboard select key 13, an autotyping select key 14, a print mode select key 15, a line end processing select key 16, a character pitch select key 17, and a line pitch select key 18.

Figure 6:
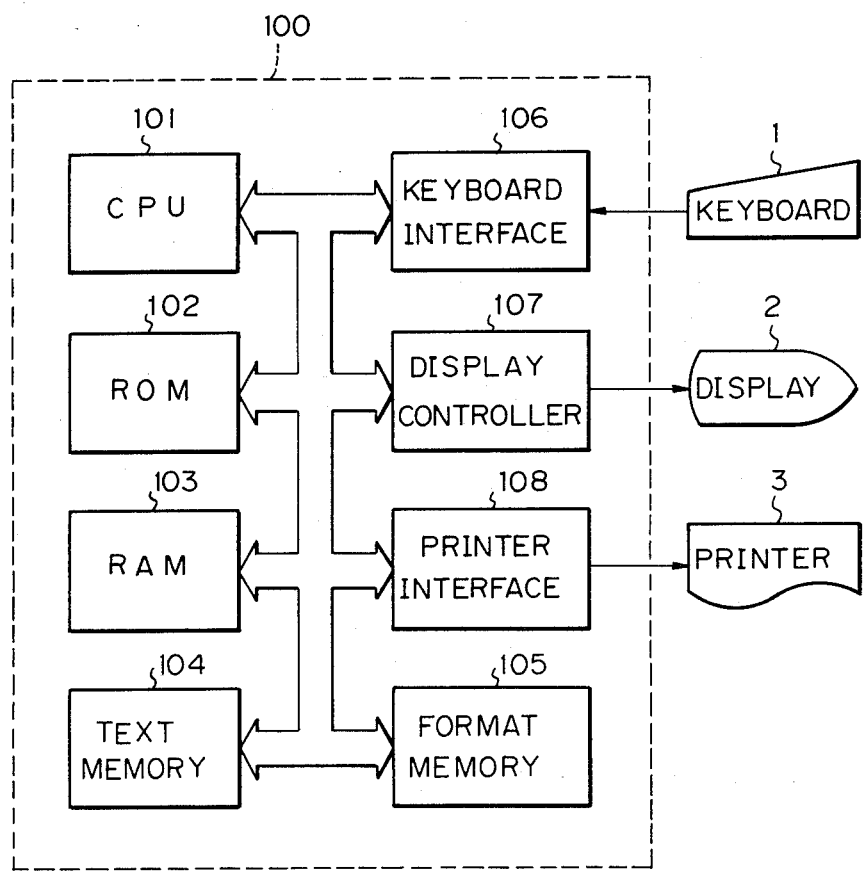
FIG. 6 is a block diagram of an electronic typewriter (ETW) controller installed in the typewriter of FIG. 2.

Referring to FIGS. 3 and 6, the operation select key 12 is manipulatable to selectively set up a store mode for filing a format, a text and phrases in an internal text memory 104, a delete mode for deleting a format, a text and phrases stored in the internal text memory 104, and a print mode for printing out data in a usual typewriter mode. The keyboard select key 13 is adapted to select either one of two symbols such as symbols "+" and "q" which are imprinted at the right and left of the same key, such as the key 32 shown in FIG. 3. The autotyping select key 14 is for selecting an automatic underlining function. The print mode select key 15 is for selecting a particular printing method, i.e., a type mode in which characters are printed out one character at a time as in an ordinary typewriter without being displayed in the display 2, and a display mode in which characters are printed out one line at a time while being displayed in the display 2. To print out characters in the display mode, carriage return key 21 may be depressed. The line end processing select key 16, shown in FIG. 3 is for selecting a normal function which starts a new line when the carriage return key 21 is depressed as in a traditional typewriter, an automatic carriage return, or auto-CR, function which automatically starts a new line when a space key 20 or a hyphen key 31 is depressed in a hot zone, and a justify function which responsive to manipulation of the hyphen key 31 starts a new line after proportionally spacing words and aligning the line end with the right margin position.

The keyboard 1 further includes function keys which are the above-mentioned space key 20, the carriage return key 21, a shift key 22, a shift lock key 23, a backspace key 24, an express backspace key 25, a halfspace key 26, a relocation key 27, a correction key 28, a code key 29, an enter/stop key 30, and other various function keys which are not shown or described.

The functions of major ones of such function keys will be outlined. The shift key 22 sets up an uppercase mode, while the shift lock key 23 locks the case mode to the uppercase mode. The backspace key 24 moves a carriage (shown in FIGS. 4 and 5) one bit to the left and, in a display mode, moves a cursor 34, shown in FIG. 3 in the display 2 one bit to the left. The express backspace key 25 moves the carriage 57 to the left margin position of the current line without starting a new line and, in a display mode, moves the cursor 34 in the display 2 to the leading end of a word or that of the line. The halfspace key 26 moves the carriage 57 $\frac{1}{2}$" to the right and, in a display mode, moves the cursor 34 in the display 2 one bit to the right.

The relocation key 27 moves the carriage 57 to the last typing position and, in a display mode, moves the cursor 34 in the display 2 to the end of the character which was entered last and, in a store mode, moves the cursor 34 to the end of the text. The correction key 28 commands deletion of an entered character and, while a display mode is selected by the print mode select key 15 (during display mode operation), deletion of a character being displayed. The code key 29, shown in FIG. 3 is usable for executing various kinds of function codes, and the enter/stop key 30 for setting up various functions, filing, calling, interrupting and resuming printout of a filed document. The coe key 29 and the "L" key of the A/N key group 11 in combination (code key+L key) selectively function to set up and cancel an automatic uppercase, or capitalize, function (automatic uppercase mode) which automatically capitalizes a character which stands at the head of a sentence.

Figure 4:
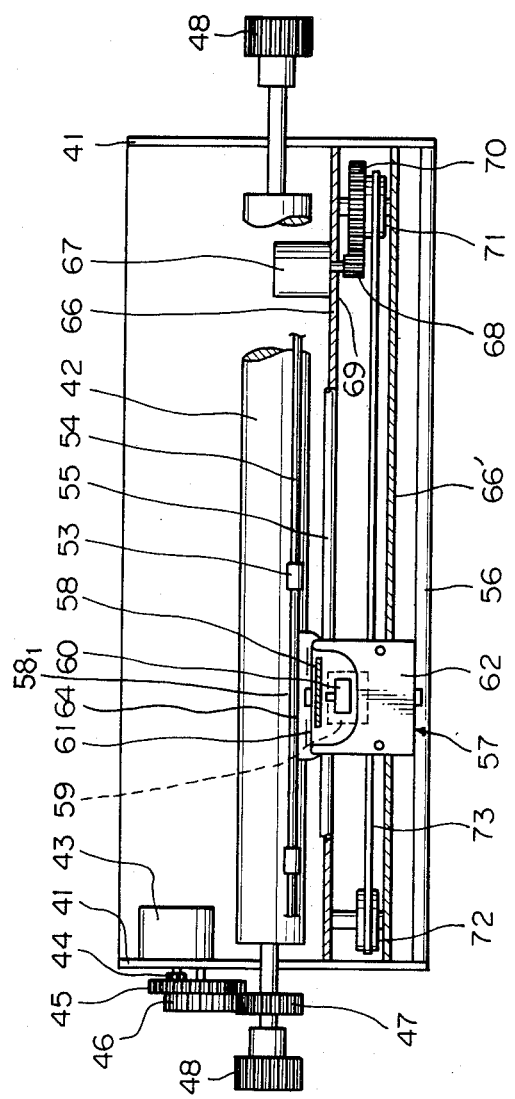
FIGS. 4 and 5 respectively are a schematic plan view and a schematic front view of a printer which is also associated with the electronic typewriter of FIG. 2.
Figure 5:
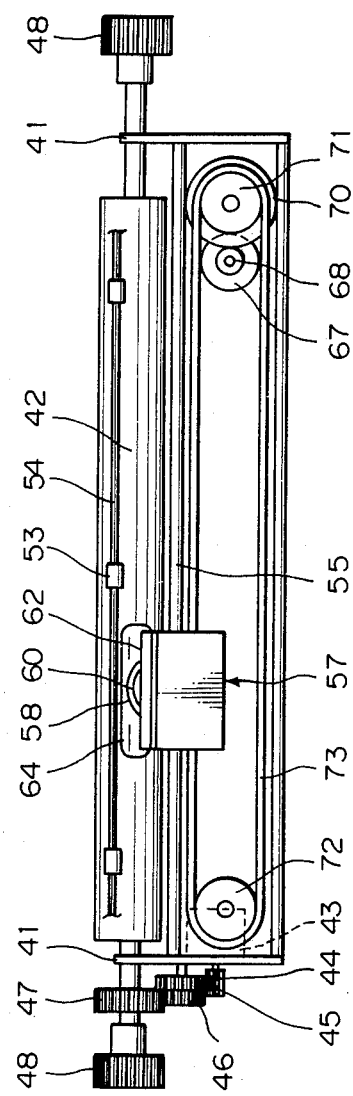

Referring to FIGS. 4 and 5, an essential part of a mechanical arrangement of the printer 3 is shown. A platen 42 is rotatably supported by a pair of frame members 41, a paper wrapping around the platen 42. A line feed motor 43 is rigidly mounted on one of the frames 41 and implemented with a stepping motor. The motor 43 drives the platen 42 via a motor gear 44, an idle gear 45, gear 46 and a platen gear 47 so that the platen 42 automatically feeds the paper. The platen 42 is provided at both ends thereof with knobs 48 which are operable to manually load an unload the paper. A paper bail 54 with bail rollers 53 is positioned in front of the platen 42 in a pivotally moveable manner and constantly urged toward the platen 42.

Rods 55 and 56 are each connected at opposite ends thereof to the frame members 41. A carriage 57 is mounted on parallel rods 55 an 56 to be movable parallel to the axis of the platen 42. Mounted on the carriage 57 are a selection motor 59 which carries a cassette type wheel 58 therewith, a hammer mechanism 60 for hammering a type $58_1$, schematically shown in FIG. 4, of the type wheel 58, a ribbon cartridge 62 in which an ink ribbon 61 is received. The selection motor 59 comprises a stepping motor. A paper guide 64 is located at the front of the carriage 57 to guide a paper along the platen 42 in the event of insertion of the paper. For automatic paper insertion, the carriage 57 is moved to a substantially center position so that a paper may be guided by the paper guide 64.

A space motor 67 which is also implemented by a stepping motor is mounted on a subframe member 66. A space gear 68 is rigidly mounted on an output shaft 69 of the space motor 67. A pulley 71 is rotatably supported by one end portion of the subframe member 66 and that of another subframe member 66', while a guide pulley 72 is rotatably supported by the other end portion of the subframe members 66 and 66'. The pulley 71 is integrally formed with a gear 70 which is held in mesh with the space gear 68. A space wire 73 is passed over the pulley 71 and the guide pulley 72 and fixed at opposite ends to the carriage 57, so that the carriage 57 is movable parallel to the platen 42 driven by the space motor 67. If desired, the selection motor 59 and the space motor 67 may each be implemented by a servo motor or, when implemented by a stepping motor as described, may each be subjected to closed control.

Referring to FIG. 6, a control arrangement built installed in the electronic typewriter is shown. The electronic typewriter controller, or ETW controller, 100 is made up of a microcomputer system which supervises the operation of the whole typewriter and serves both the functions of the decision circuit A and the capitalizing circuit B of FIG. 1, a text memory 104 for storing a prepared text, and a format memory 105 for storing a text format. The microcomputer system mentioned above includes a central processing unit (CPU) 101, a read only memory (ROM) 102, and a random access memory (RAM) 103 usable as, for example, an input data memory adapted to store entered data. Also included in the ETW controller 100 are a keyboard interface 106 which governs data entry through the keyboard 1, transfer of turn on control data from the ETW controller 100 to light-emitting diodes (LED) which are provided in predetermined ones of the keys on the keyboard 1, etc. The keyboard interface 106 also serves the function of a buffer memory. Further included in the ETW controller 100 are a display controller 107 for controlling the display 2, and a printer interface 108 for supervising exchange of print data, ready signals and others between the ETW controller 100 and the printer 3.

Figure 7:
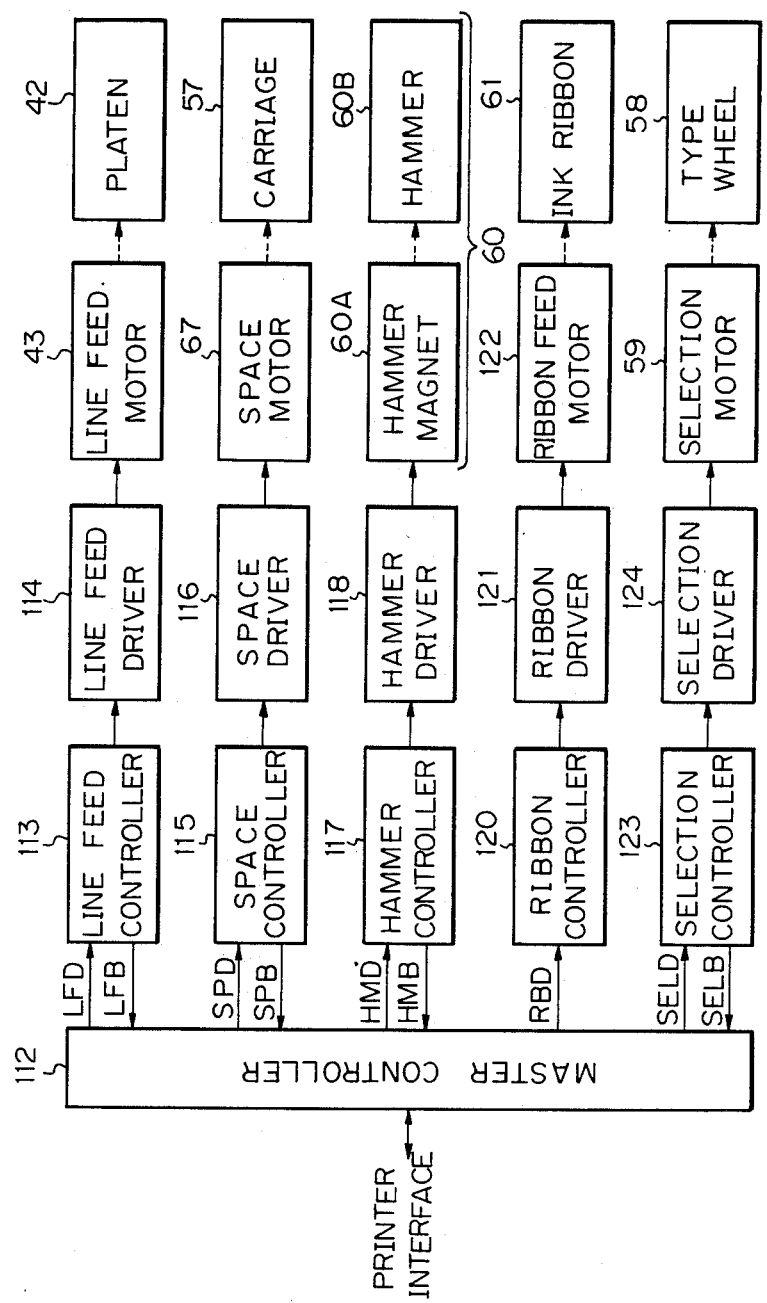
FIG. 7 is a block diagram of a printer controller of the typewriter shown in FIG. 2.

Referring to FIG. 7, a control section built in the printer 3 is shown. The printer control section includes a master controller 112 which may be implemented by a microcomputer system, for example. The master controller 112 fulfills the role of controlling various sections of the printer 3 responsive to type code data (type information), space (carriage movement distance) data, line feed data and other various data produced by the ETW controller 100 as well as busy signals and others from various control circuits which will be described. Specifically, the master controller 112 controls various printer sections by delivering the line feed data LFD indicative of an amount and a direction of rotation of the platen 42, space data SPD indicative of an amount and a direction of movement of the carriage 57, hammer pressure data HMD instructing a drive of the hammer mechanism 60 including the hammer magnet 60A and the hammer 60B, ribbon feed data RBD instructing a feed of the ink ribbon 61, and selection data SELD indicative of an amount and a direction of rotation of the type wheel 58.

A line feed controller 113 responds to line feed data LFD from the master controller 112 by delivering a drive pulse to a line feed driver 114 which then drives the line feed motor 43 by a required amount in a required direction. At the same time, the line feed controller 113 applies a line feed busy signal LFB to the master controller 112. A space controller 115 responsive to space data SPD from the master controller 112 feeds a drive pulse to a space driver 116 to drive the space motor 67, thereby moving the carriage 57 by a required amount in a required direction. Simultaneously, the space controller 115 applies a space busy signal SPB to the master controller 112. A hammer controller 117 responsive to hammer pressure data HMD from the master controller 112 applies a drive pulse to a hammer driver 118 to drive a hammer magnet 60A, which is included in the hammer mechanism 60. The hammer magnet 60A in turn causes the hammer 60B to strike a type of the type wheel 58 with a required pressure. In the meantime, the hammer controller 117 applies a hammer busy signal HMB to the master controller 112.

A ribbon controller 120 responsive to ribbon feed data RBD from the master controller 112 applies a drive pulse to a ribbon feed driver 121 to drive a ribbon feed motor 122, thereby feeding the ink ribbon 61 by a necessary amount. Further, a selection controller 123 responsive to selection data SELD from the master controller 112 delivers a drive pulse to a selection driver 124 to drive the selection motor 59. The motor 59 then rotates the type wheel 58 by a required amount in a required direction so that a type to print out desired data is brought into alignment with the hammer mechanism 60. The selection controller 123 applies a selection busy signal SELB to the master controller 112.

The operation of the electronic typewriter having the above construction will be described with reference also made to FIGS. 8-15B.

Figure 8:
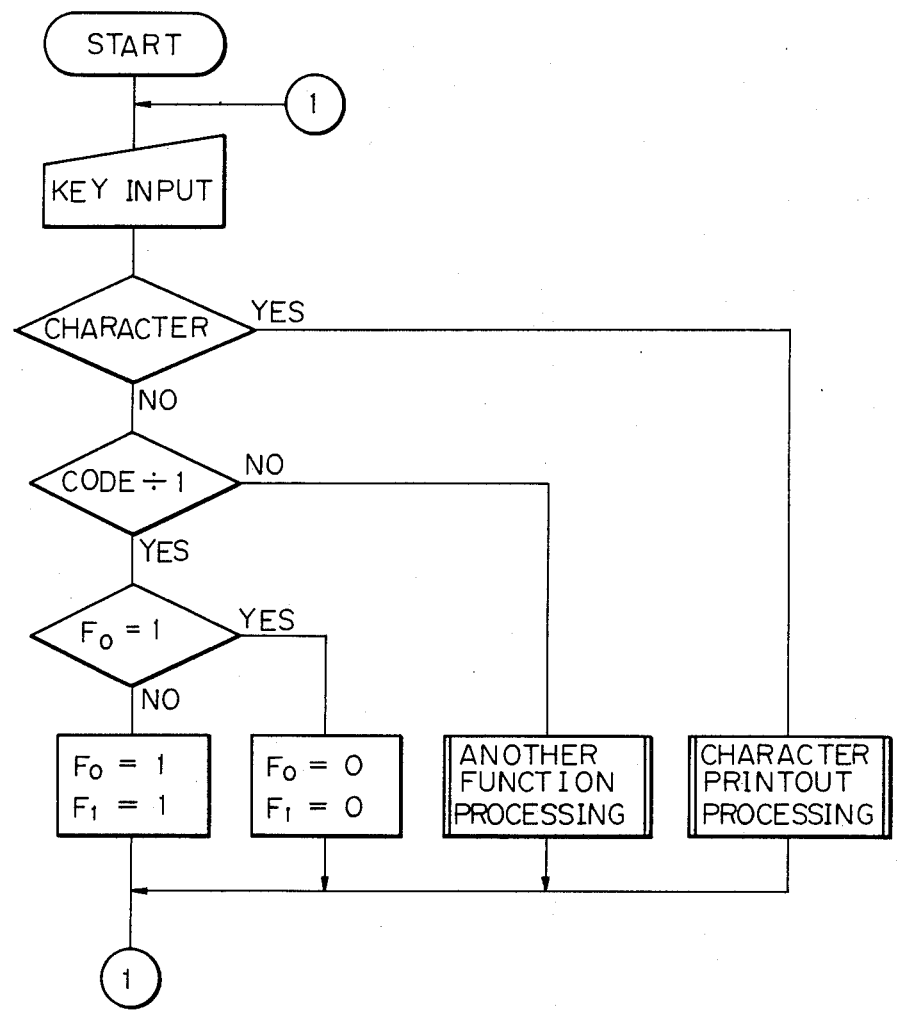
FIG. 8 is a flowchart demonstrating processing which the ETW controller executes.

Referring to FIG. 8, responsive to a key input, the ETW controller 100 determines whether or not the input data is a character code. If it is not a character code (inclusive of a character key after the depression of the code key 29), the ETW controller 100 sees if the key input is (code key 29+"L" key) representative of setup/cancel of an automatic uppercase mode. If the result of the decision is "YES", the controller 100 decides whether or not a flag $F_0$ which is to be set in an automatic uppercase mode is a ONE. If it is not a ONE, that is, if an automatic uppercase mode has not been selected, the controller 100 turns the flag $F_0$ to a ONE to set up an automatic uppercase mode and, at the same time, turns a flag $F_1$ adapted to see if a character entered is the first letter input after the setup of an automatic uppercase mode to a ONE. If the flag $F_0$ is a ONE, meaning that an automatic uppercase mode has been selected, the controller 100 resets the flag $F_0$ to a ZERO to cancel the automatic uppercase mode and, at the same time, turns the flag $F_1$ to a ZERO. Further, if the key input is not (code key 29+"L" key), the controller 100 executes another function processing.

Meanwhile if the key input is a character code, the controller 100 stores the entered character in the data buffer (RAM) 103 and enters into a character printout processing.

Figure 9:
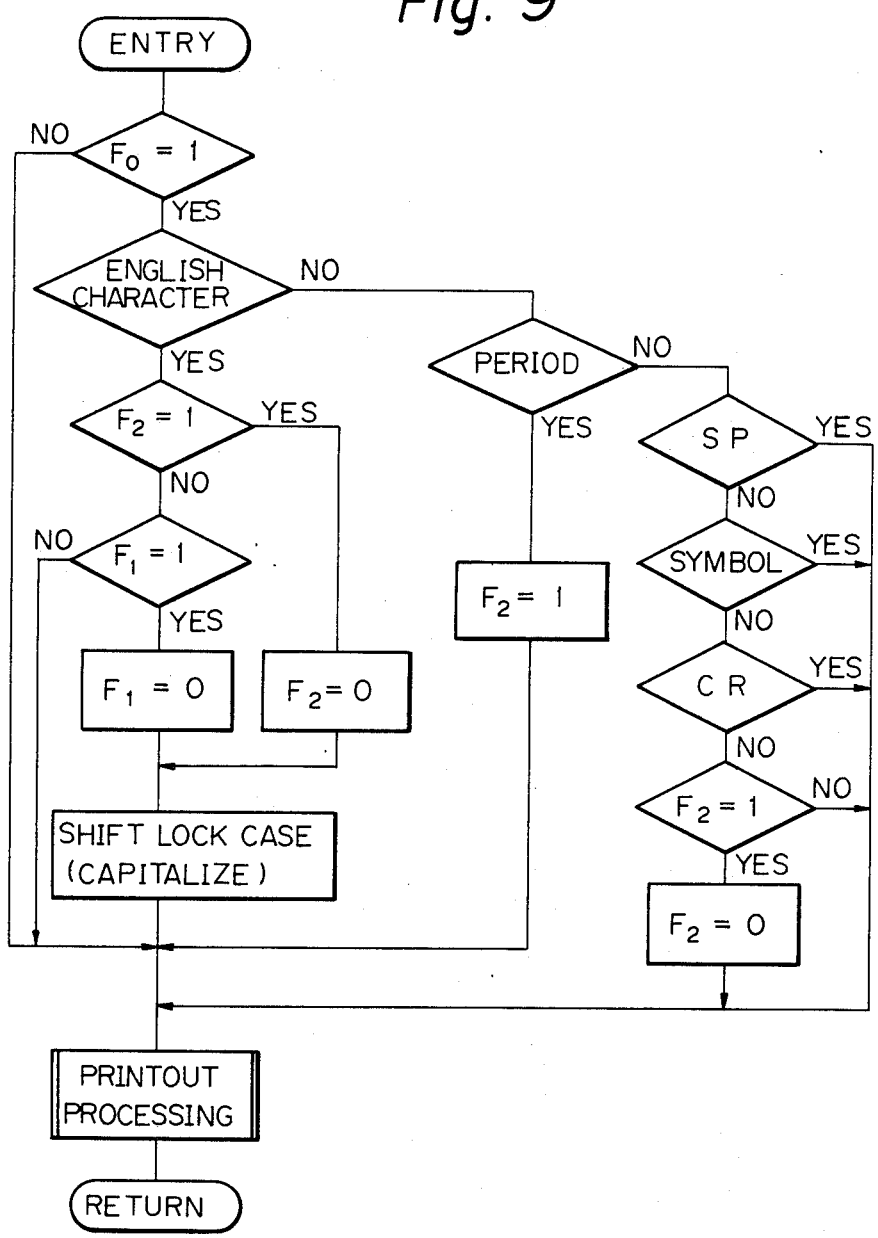
FIG. 9 is a flowchart demonstrating an exemplary procedure which the ETW controller also executes at the time of printing out a character.
Figure 10B:
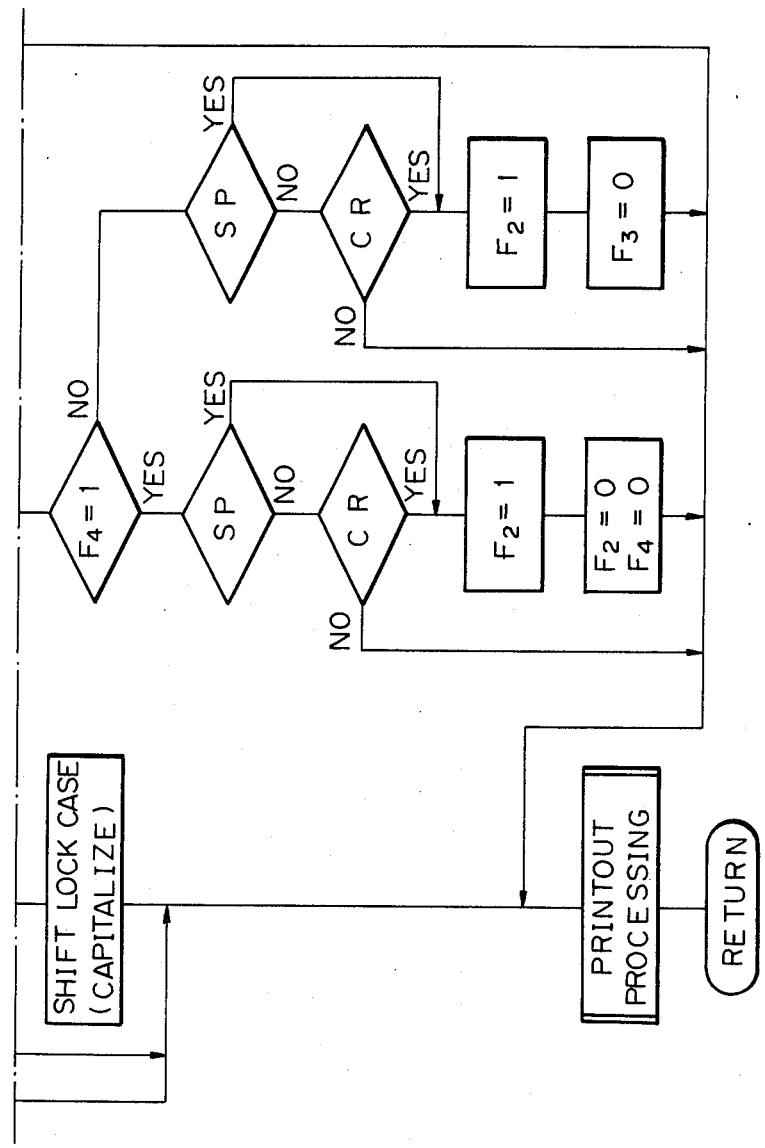
FIG. 10 is a flowchart demonstrating another exemplary procedure associated with printout of a character.

Referring to FIGS. 9 and 10, the character printout processing is shown. Generally, in English documents, a sentence ends with a period and the next sentence begins after a symbol, a space, and/or a carriage return. Therefore, the following characters may generally be regarded as those which appear at the beginning of a sentence:

(1) character at the beginning of document;
(2) character after period+space;
(3) character after period+symbol+space;
(4) character after period+space+symbol;
(5) character after period+CR (carriage return);
(6) character after period+symbol+CR; and
(7) character after period+CR+symbol.

Since a period is also usable as a decimal point, such a case has to be expected.

Hence, the following procedure may be contemplated to decide whether a character to be processed is one which heads a sentence. Firstly, a character which is to be processed just after a period is in principle regarded as heading a sentence, while a result of decision is cancelled when a character appearing just after a period is other than a symbol, a space or a CR. Secondly, whether a combination of characters after a period belongs to any one of the combinations (1)-(7) stated above is determined.

Referring to FIG. 9, a flowchart representative of the above-mentioned first decision processing is shown. When data (entered character) is read out of the data buffer (RAM) 103, the ETW controller 100 sees if the flag $F_0$ is a ONE, meaning that an automatic uppercase mode has been selected. If $F_0$ is not a ONE, that is, if an automatic uppercase mode has not been set, the controller 100 executes printout processing for printing out the entered character. If $F_0$ is a ONE, implying an automatic uppercase mode, the controller 100 determines whether the entered character is an English character.

If it is an English character, the controller 100 determines whether a flag $F_2$ indicative of whether a character heads a sentence, as will be described, is a ONE. If $F_2$ is not a ONE, the controller 100 sees if the previously mentioned flag $F_1$ is a ONE to thereby determine whether the entered character is the first character after the selection of an automatic uppercase mode. If $F_1$ is not a ONE, the controller 100 enters into the printout processing. If $F_1$ is a ONE, showing that the entered character is the first English character after the selection of an automatic uppercase mode (character with which a sentence begins) then $F_1$ is set to ZERO. Then the controller 100 performs shift lock case processing (change to a capital letter) and, then, the printout processing. Concerning ASCII codes, for example, such a change to an uppercase character will be accomplished merely by changing a bit $b_6$ of an input character code because a lowercase character and an uppercase character are the same as each other except for the particular bit $b_6$, which is either a ONE or ZERO. When the flag $F_2$ is a ONE, also showing that the entered character is one which heads a sentence, the controller 100 turns the flag $F_2$ to a ZERO and, then, sequentially performs the capitalizing processing and the printout processing.

On the other hand, if the entered character is not an English character, the controller 100 determines whether or not the character is a period with which a sentence ends. If the result is "YES", the controller 100 decides that a sentence has ended there, then turns the flag $F_2$ for capitalizing the next English character to a ONE, and then enters into the printout processing. If the character is not a period, the controller 100 determines whether it is a space (SP) and, if the result is "YES", enters into the printout processing. If the character it not a space, the controller 100 sees if it is a symbol and, if the result is "YES", starts on the printout processing. If the character is not a symbol, the controller 100 determines whether it is a carriage return, hereinafter called CR, and, if the result is "YES", starts on the printout processing.

If the character is not a space, hereinafter called SP, a symbol or a CR, the controller 100 sees if the flag $F_2$ is a ONE and, if so, turns the flag $F_2$ to a ZERO and then enters into the printout processing. In short, although the controller 100 responds to entry of a period by setting the flag $F_2$ ($F_2=1$) to thereby capitalize the next character, it responds to a period, which is followed by a character other than a space, a symbol and a CR, by resetting the flag $F_2$ to cancel the result of decision because that period is used as a decimal point or the like.

Referring to FIG. 10, a flowchart demonstrating the previously mentioned second decision processing is shown. Where an entered character is an English character, the same procedure as that of FIG. 9 occurs. On the other hand, where the entered character is not an English character, the controller 100 determines whether it is a period or not and, if it is a period, sets the flag $F_3$ to a ONE. If it is not a period, then the controller 100 sees if the flag $F_3$ is a ONE. If it not a ONE, the controller 100 executes the printout processing and, if it a ONE, determines whether the entered character is a symbol or not. If it is a symbol, the controller 100 sets the flag $F_4$ to a ONE and, if it not, decides whether the flag $F_4$ is a ONE.

If the flag $F_4$ is a ONE, the controller determines whether the entered character is a space or a CR. If the character is a space or a CR, the controller 100 turns the flag $F_2$ to a ONE and then each of the flags $F_3$ and $F_4$ to a ZERO. If it is neither a space nor a CR, the controller 100 starts on the printout processing. Such a procedure covers the previously mentioned occurrences (3) and (6), that is, when "period+symbol+space" or "period+symbol+CR" is entered, the controller 100 turns the flag $F_2$ to a ONE to capitalize the next English character. If the flag $F_4$ is not a ONE, the controller 100 determines whether the entered character is a space or a CR and, if it is one of them, turns the flag $F_2$ to a ONE and then the flag $F_3$ to a ZERO. If the character is neither a space nor a CR, the controller 100 starts on the printout processing. This covers the occurrences (2), (4), (5) and (7), that is, when "period+space" or "period+CR" is entered, the controller 100 turns the flag $F_2$ to a ONE to capitalize the next English character.

The procedures described so far will be discussed in relation to specific examples which are shown in FIGS. 11A-15B. The following description will concentrate to the processing described with reference to FIG. 9 by way of example.

(1) FIGS. 11A and 11B

A case is shown in which after an automatic uppercase mode has been set up (flags $F_0$, $F_1$=ONE) characters "the head . . . " are entered in a small letter mode as shown in FIG. 11A. In this situation, since the initial character "t" is an English character and the first character after the selection of an automatic uppercase mode and since the flag $F_1$ is a ONE, it is changed to a capital "T" and then printed out. The characters following the character "t" are printed out as they are partly because they are void of a period and partly because a space is processed as a space, that is, because the flag $F_2$ is a ZERO and the flag $F_1$ has already been reset to a ZERO at the time of entry of the character "t". As a result, the entered sentence is printed out as "The head . . . ", as shown in FIG. 11B.

(2) FIGS. 12A and 12B

A case is shown wherein, as shown in FIG. 12A, in an automatic uppercase mode the characters "the . . . an unexpected." (hereinafter referred to as a first sentence) is entered, followed by a "space" and then the characters "the head . . . " (hereinafter referred to as a second sentence) continuously (without starting a new line). In FIG. 12A, the "space" is represented by a phantom square (not printed out). The procedure associated with the characters before the ". (period)" of the first sentence is the same as the case shown in FIGS. 11A and 11B. Since the period "." at the end of the first sentence is not an English character and is a period, the flag $F_2$ is turned to a ONE and then the period "." is printed out. As a result, the first sentence is printed out as "The . . . an unexpected.", as shown in FIG. 12B.

Then, the space which follows the first sentence is inserted as it is as represented by the phantom square. When the initial character "t" of the second sentence is entered after the space, it is determined to be an English character and, at this instant, the flag $F_2$ has been turned to a ONE by the entry of the period of the first sentence. Hence, the character "t" at the head of the second sentence is printed out as a capital "T". Then, the characters which follow the initial "t" of the second sentence are printed out by the same procedure as the one applied to the first sentence. As a result, the second sentence is printed out as "The head . . . " as shown in FIG. 12B.

(3) FIGS. 13A and 13B

A case is shown in which in an automatic uppercase mode the characters "the . . . an unexpected." (hereinafter referred to as a first sentence) are entered, followed by a carriage return (CR) (indicated by a mark "↵" in FIG. 13A and not printed out) and then characters "the head . . . " (hereinafter referred to as a second sentence), as shown in FIG. 13A. In this case, too, the flag $F_2$ is turned to a ONE upon entry of the period "." at the end of the first sentence, as previously discussed. Since the period "." is followed by the carriage return (CR), the flag $F_2$ remains as a ONE. When the initial character "t" of the second sentence is entered after the carriage return, it is changed to a capital "T" and printed out because it is an English character and because the flag $F_2$ is a ONE. The characters of the second sentence which follow the initial "t" are printed out by the same processing as applied to the first sentence. As a result, as shown in FIG. 13B, the first sentence is printed out as "The . . . an unexpected." and the second sentence as "The head . . . "

(4) FIGS. 14A and 14B

A case is shown wherein, as shown in FIG. 14A, in an automatic uppercase mode the words "we're dealing . . . dealer network." (hereinafter referred to as a first sentence), "space", and "the dealer . . ." (hereinafter referred to as a second sentence) are sequentially entered without starting a new line. Again, the flag $F_2$ becomes a ONE when the period "." of the first sentence is entered. Since the characters which immediately follow the period "." of the first sentence are """" and a space, the flag $F_2$ remains as a ONE. Hence, the initial character "t" of the second sentence which follows the space is printed as a capital "T" because it is an English character and because the flag $F_2$ is a ONE. As a result, as shown in FIG. 14B, the first sentence is printed out as """We're dealing . . . dealer network."" and the second sentence as "The dealer . . . "

(5) FIGS. 15A and 15B

A case is shown wherein, as shown in FIG. 15A, in a lowercase mode the characters ". . . selling out product." (hereinafter referred to as a first sentence) are entered, followed by "space" and then the words """we're dealing . . . " (hereinafter referred to as a second sentence) continuously (without starting a new line). In this case, too, the flag $F_2$ becomes a ONE when the period "." of the first sentence has been entered. The next characters which follow the period "." of the first sentence are a space and a symbol """", the flag $F_2$ therefore remaining as a ONE. In this condition, when the character "w" has been entered after the symbol """" which heads the second sentence, it is printed out as a capital "W" because it is an English character and because the flag $F_2$ is a ONE. As a result, as shown in FIG. 15B, the first sentence is printed out as ". . . selling out product." and the second sentence as """We're dealing . . . "

In any of the cases described above, when a period "." is entered as a decimal point in a sentence, the entry of the period "." turns the flag $F_2$ to a ONE as previously stated. In this case, however, the decimal point "." is followed by a character other than a space and symbols (usually a numeral) so that the flag $F_2$ which is then a ONE is turned to a ZERO. Therefore, even if an English character is entered afterwards, it is not regarded as heading a sentence and is printed out as a lowercase character because the flag $F_2$ is a ONE. Meanwhile, to capitalize a particular character or characters in a sentence, the automatic uppercase mode may be cancelled and the shift key 22 or the shift lock key 23 manipulated.

As described above, the electronic typewriter in the illustrative embodiment decides whether a character to be processed is one which heads a sentence and, if so, automatically capitalizes it. This eliminates the need for manipulating the shift key 22 or the shift lock key 23 otherwise required to capitalize each character which leads a sentence, thereby enhancing operationability.

While in the illustrative embodiment an automatic uppercase mode is selected and cancelled using the combination of (code key+"L" key), such a function may be assigned to any other combination of keys.

Alternatively, an arrangement may be made such that when a predetermined key such as a shift key 22 or a shift lock key 23 is manipulated during automatic uppercase mode operation, the automatic uppercase mode is temporarily (by one character or until the same key is manipulated again) cancelled. Such will improve the operationability when one desires to capitalize a particular English character or characters in a sentence.

Furthermore, although the present invention has been shown and described in relation to an English electronic typewriter, it is similarly applicable to German, French and other typewriters as well as to a document preparing and editing equipment (word processor) and other data processing equipment having a document preparing capability and document preparing equipment with an automatic translation capability.

In summary, it will be seen that the present invention provides a document preparing apparatus which achieves improved operationability.

Various modifications will become possible for those skilled in the art after receiving the teachings of the present disclosure without departing from the scope thereof.

What is claimed is:

1. A document preparing apparatus comprising decision means for determining whether or not a character entered after depression of a period is the first letter of a sentence on the basis of data which are entered after the entry of the period; and
   a capitalizing means for changing a character to be processed to a capital letter only when the decision means decides that the first entered character after the period is the first character of a sentence;
   wherein said decision means comprises means for determining whether a character to be processed is the first character of a sentence in accordance with whether the character sequentially follows one of the beginning of a document, selection of a period and a space, selection of a period and a symbol and a space, selection of a period and a space and a symbol, selection of a period and a carriage return, selection of a period and a symbol and a carriage return, and selection of a period and a carriage return and a symbol.

2. A document preparing apparatus as claimed in claim 1, wherein said capitalizing means comprises instruction means for instructing validity/invalidity of the capitalizing processing.

3. A document preparing apparatus as claimed in claim 1, wherein the capitalizing means comprises means for effecting printout every time one character is entered or everytime one line of characters are entered.

4. A document preparing apparatus as claimed in claim 2, wherein the capitalizing means comprises means for effecting printout every time one character is entered or every time one line of characters are entered.

* * * * *